US00RE35183E

United States Patent [19]

Ose et al.

[11] E Patent Number: Re. 35,183

[45] Reissued Date of Patent: Mar. 19, 1996

[54] DEFLECTION YOKE FOR USE IN COLOR CATHODE RAY TUBES

[75] Inventors: Toshio Ose; Toshifumi Yoshida, both of Osaka; Katsuyo Iwasaki, Hyogo, all of Japan

[73] Assignee: Matsushita Electronics Corporation, Osaka, Japan

[21] Appl. No.: 246,016

[22] Filed: May 19, 1994

Related U.S. Patent Documents

Reissue of:

[64] Patent No.: 5,115,170
Issued: May 19, 1992
Appl. No.: 558,740
Filed: Jul. 27, 1990

[30] Foreign Application Priority Data

Jul. 31, 1989 [JP] Japan ..... 1-199005

[51] Int. Cl.[6] ..... H01J 29/56

[52] U.S. Cl. ..... 315/370; 335/213

[58] Field of Search ..... 315/370, 371, 315/400; 335/213

[56] References Cited

U.S. PATENT DOCUMENTS

| | | | |
|---|---|---|---|
| 3,714,500 | 1/1973 | Kaashoek . | |
| 3,792,305 | 2/1974 | Lister . | |
| 4,554,488 | 11/1985 | Kobayashi et al. . | |
| 4,728,915 | 3/1988 | Konosu et al. . | |
| 4,737,692 | 4/1988 | Okuyama et al. | 315/371 |
| 4,818,919 | 4/1989 | Kobayashi et al. | 315/371 |

FOREIGN PATENT DOCUMENTS

| | | |
|---|---|---|
| 0145483 | 6/1985 | European Pat. Off. . |
| 60-91536 | 5/1985 | Japan . |
| 1454679 | 11/1976 | United Kingdom . |
| 1461796 | 1/1977 | United Kingdom . |
| 1510536 | 5/1978 | United Kingdom . |

*Primary Examiner*—Theodore M. Blum
*Attorney, Agent, or Firm*—Panitch Schwarze Jacobs & Nadel

[57] ABSTRACT

A deflection yoke for color cathode ray tubes, the deflection yoke including a vertical deflection coil for generating a vertical deflecting magnetic field having a barrel-shaped distortion, and a horizontal deflection coil for generating a horizontal deflection magnetic field having a pin-cushion shaped distortion, a differential coil connected to the horizontal deflection coil, a pair of cores located in opposite positions at a smaller rim portion of the yoke, the cores being provided with coils for generating a quadripolar magnetic field, a pick-up coil magnetically coupled to the differential coil or the horizontal deflection coil, and a current waveform shaping circuit for supplying a current to the quadripolar magnetic field generating coils.

9 Claims, 6 Drawing Sheets

DEFLECTION YOKE FOR USE IN COLOR CATHODE RAY TUBES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a deflection yoke for use in color cathode ray tubes to produce a magnetic field so as to deflect the electron beams.

2. Description of the Prior Art

In general, a deflection yoke used in color cathode ray tubes with an in-line type electron gun is designed to produce a pin-cushion shape horizontal deflection magnetic field and a barrel-shape vertical deflection magnetic field. This type of yoke, commonly called a self-convergence type, is advantageous in that it does not require a complex convergence circuit. On the other hand, this type of yoke is likely to involve misconvergence of the pattern as shown in FIGS. 14(a), (b) and (c), owing to an erroneous assembly of the electron gun and/or the yoke itself. The misconvergences of the pattern shown in FIGS. 14(a) and (b) are caused owing to an axial misalignment, but can be fixed by correcting the tilt of the deflection yoke or alternatively either by adjusting a differential coil connected to the horizontal deflection coil or a differential resistance connected to the vertical deflection coil. In contrast, the misconvergence shown in FIG. 14(c) is caused owing to a rotational misalignment, to which the above-mentioned correction methods cannot be applied. In FIGS. 14(a), (b) and (c) the line R represents a lateral red line, the line B represents a lateral blue line, b, g and r represent the sources of electron beams for blue, green and red, respectively.

Japanese Laid-Open Patent Publication No. 60-91536 discloses a means of correcting a misconvergence, which includes a two-pole magnetic ring, a four-pole magnetic ring, and a six-pole magnetic ring, and additionally, another quadripolar magnet ring so as to correct a misconvergence due to a rotational misalignment. There is another method for correcting misconvergence, which includes a magnetic ring provided in the other deflection coil as a magnetic shield whereby an equivalently reversed misconvergence is deliberately caused.

The known correcting methods of misconvergence described above have disadvantages, in that, with the first method the two quadripolar magnet rings must be alternately rotated until the correction is effected. The repetition of the alternate rotation of the magnet rings is likely to unfavorably affect the convergence characteristics in the center of the fluorescent screen. In the second method it is difficult to correct the whole fluorescent screen.

SUMMARY OF THE INVENTION

The deflection yoke of this invention, which overcomes the above-discussed and numerous other disadvantages and deficiencies of the prior art, comprises a larger rim portion and a smaller rim portion, a vertical deflection coil for generating a vertical deflecting magnetic field having a barrel-shaped distortion, and a horizontal deflection coil for generating a horizontal deflection magnetic field having a pin-cushion shaped distortion, a differential coil connected to the horizontal deflection coil, a pair of cores located in opposite positions at the smaller rim portion, the cores being provided with coils for generating a quadripolar magnetic field, a pick-up coil magnetically coupled to the differential coil or the horizontal deflection coil, and a current waveform shaping circuit for supplying a current to the quadripolar magnetic field generating coils.

In a preferred embodiment, the differential coil is wound around the same bobbin as that for use in the pick-up coil.

In another preferred embodiment, the pick-up coils are located near windows of the horizontal deflection coil.

In a further preferred embodiment, the pick-up coils are coupled to the respective ends of the horizontal deflection coil.

In a still further preferred embodiment, the pick-up coils are provided by part of the horizontal deflection coil.

In another preferred embodiment, each of the pair of cores comprises a ferrite bar shaped like the letter I or letter U.

In a preferred embodiment, the correction current comprises a half-cycle of positive or negative component of the saw-tooth current.

In another preferred embodiment, the correction current is a parabolic waveform current.

Thus, the invention described herein makes possible the objects of (1) providing a deflection yoke which makes it easy to correct a misconvergence due to rotational misalignment by adjusting the deflection yoke, and (2) providing a deflection yoke capable of correcting misconvergence without unfavorably affecting the convergence characteristics over the whole fluorescent screen.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
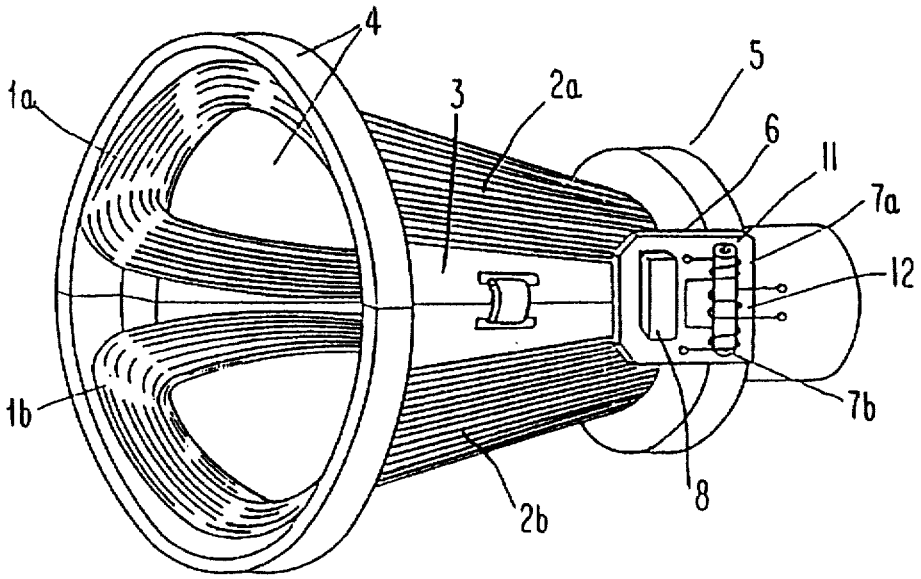
FIG. 1 is a perspective view showing a deflection yoke according to the present invention.
Figure 2:
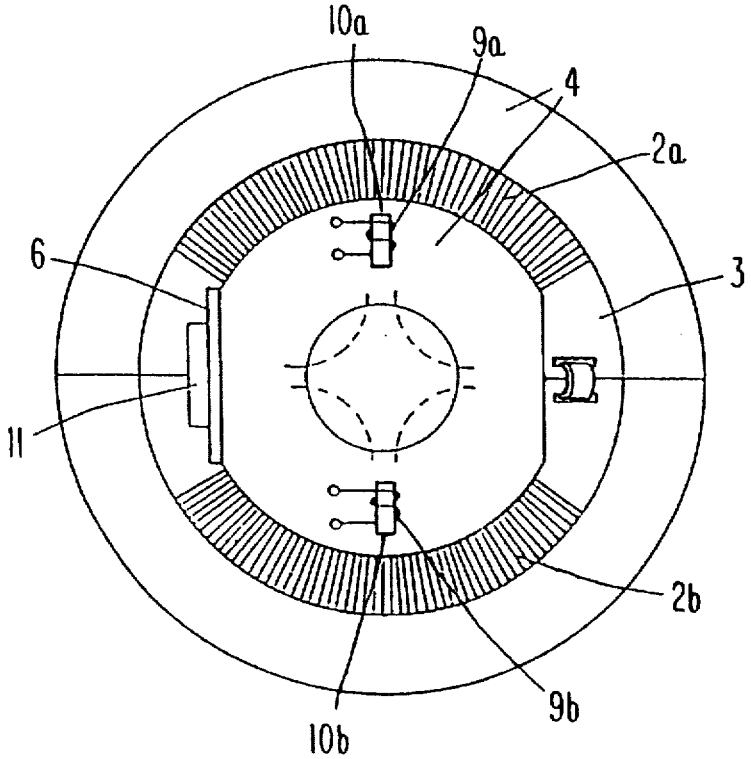
FIG. 2 is a rear view showing the deflection yoke of FIG. 1.

Referring to FIGS. 1 and 2, there is provided a deflection yoke 5 which includes a pair of saddle-type horizontal deflection coils 1a and 1b, a pair of toroidal type vertical deflection coils 2a and 2b having a ferrite core 3, and an insulating frame 4 of synthetic resin.

The deflection yoke 5 is provided with a pair of differential coils 7a and 7b mounted on a printed board 6, a circuit element 8 adapted to shape a waveform of a current, and a pair of ferrite cores 10a and 10b shaped like the letter I around which coils 9a and 9b are wound to generate a quadripolar magnetic field.

Figure 3:
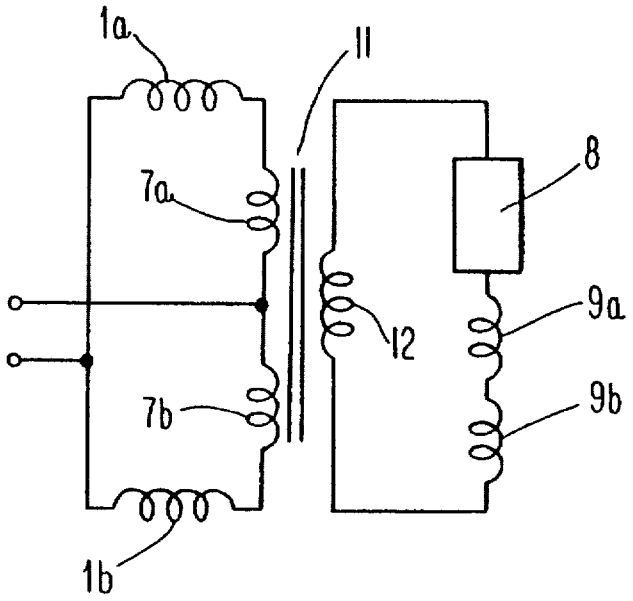
FIG. 3 is a circuit diagram showing a horizontal deflection magnetic field of the yoke of FIG. 1.

The differential coils 7a and 7b are wound around a bobbin 11, around which a pick-up coil 12 is also wound. The pick-up coil 12, electromagnetically coupled to the differential coils 7a and 7b, is connected to the coils 9a and 9b through a circuit 8, which is to shape the waveform of a current as shown in FIG. 3.

Figure 4A:
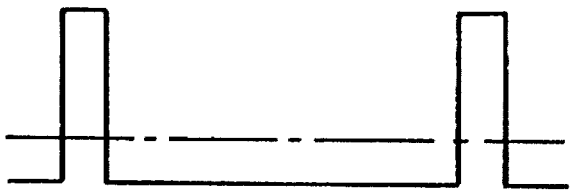
FIGS. 4(a) and (b) are diagrammatic views showing the waveform of pulse voltage induced in the pick-up coil of the circuit and the waveform of a current flowing through a coil for generating a quadripolar magnetic field.
Figure 4B:
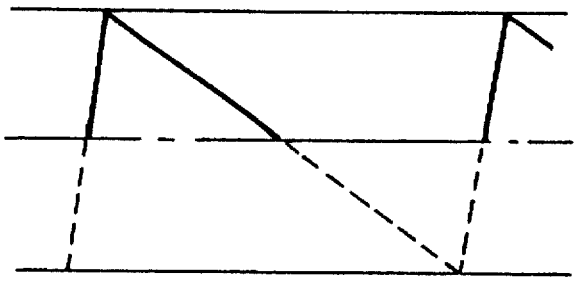

When a current passes through the pair of horizontal deflection coils 1a and 1b and the pair of deflection coils 7a and 7b, a pulse voltage as shown in FIG. 4(a) is induced in the pick-up coil 12. The waveform of this pulse voltage is shaped by a waveform shaping circuit, which includes a coil, a resistance and a diode. As a result, it is shaped into a sawtooth waveform current as shown in FIG. 4(b) (synchronous with the horizontal deflection cycle), and flows through the coils 9a and 9b.

Figure 5:
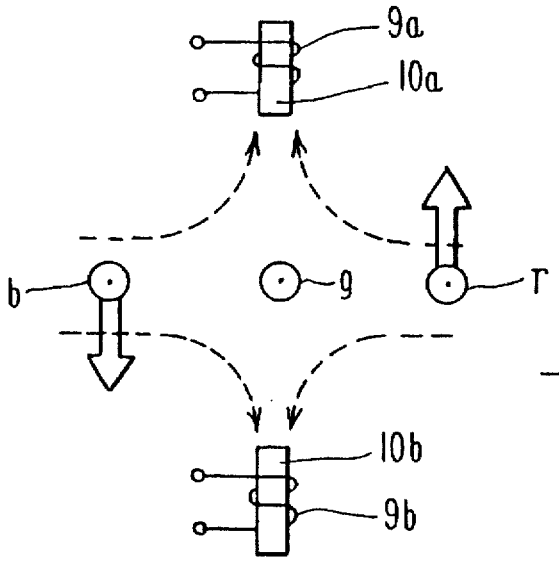
FIG. 5 is an explanatory view illustrating the relationship between the quadripolar magnetic field and the electron beam.
Figure 6:
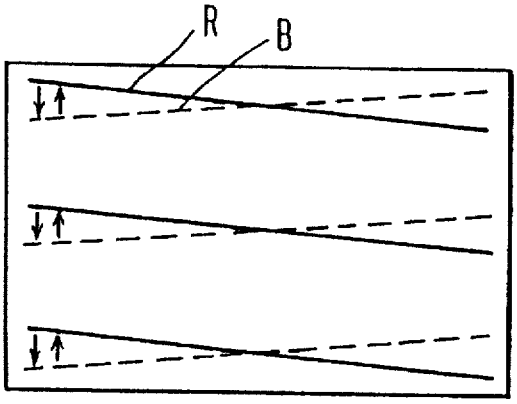
FIG. 6 is a diagrammatic view showing directions in which the lateral red and blue lines on the screen are subjected to deflection by the quadripolar magnetic field.
Figure 14A:
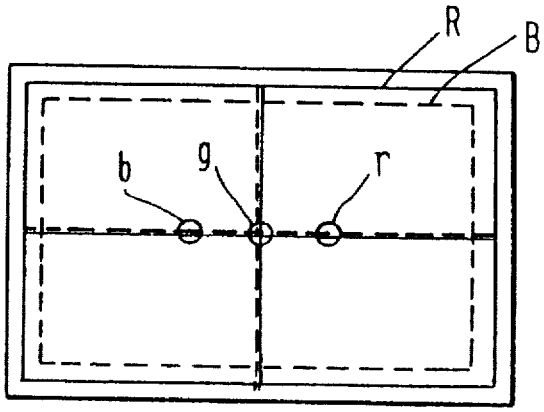
FIGS. 14(a), (b) and (c) are diagrammatic views showing patterns of misconvergence.
Figure 14B:
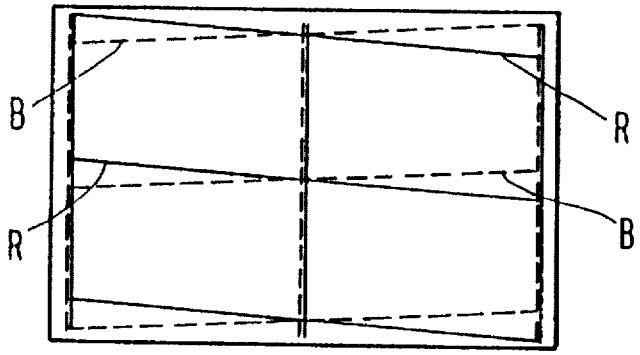
Figure 14C:
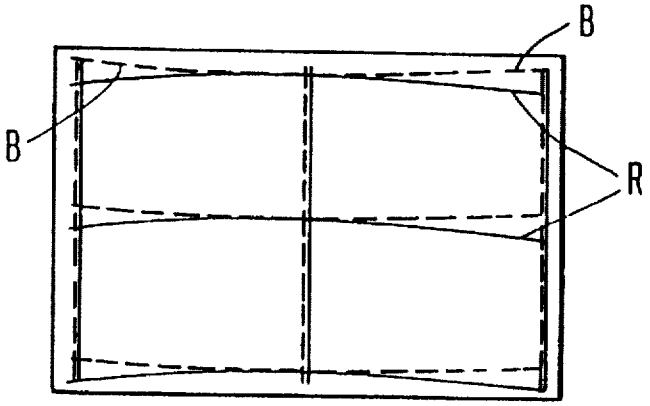

This saw-tooth current flows through the coils 9a and 9b only for a half cycle period during which the left-hand portion of the screen is scanned by beam, and the resulting quadripolar magnetic field acts on the electron beams b and r at opposite sides as indicated by dotted lines in FIG. 5. The electron beams b and r are subjected to upward and downward forces in the directions of large arrows in FIG. 5, and the red line R and the blue line B are deflected in the direction of the arrows. As shown in FIG. 14(c), the direction of this deflection is opposite to that of the misconvergence due to a rotational misalignment. Thus, the misconvergence shown in FIG. 14(c) is converted into a misconvergence of the pattern shown in FIG. 14(b). The misconvergence converted in this way is corrected by adjusting the coils 7a and 7b in a known manner.

If any pattern opposite to that shown in FIG. 14(c) occurs in which the lateral blue line B appears below the lateral red line R around a peripheral portion of the fluorescent screen, the misconvergence can be corrected by reversing the flowing direction of a current flowing through the coils 9a and 9b in the current waveform shaping circuit.

Figure 7:
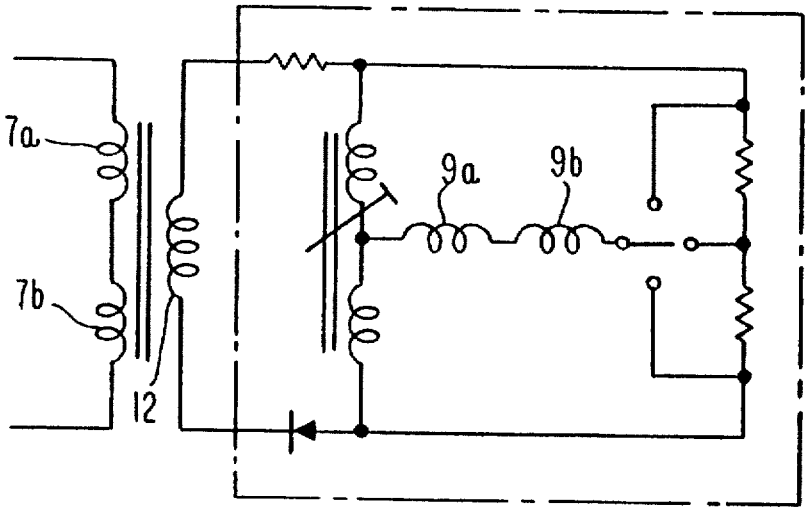
FIG. 7 is a diagram showing a circuit for shaping a current waveform.
Figure 8:
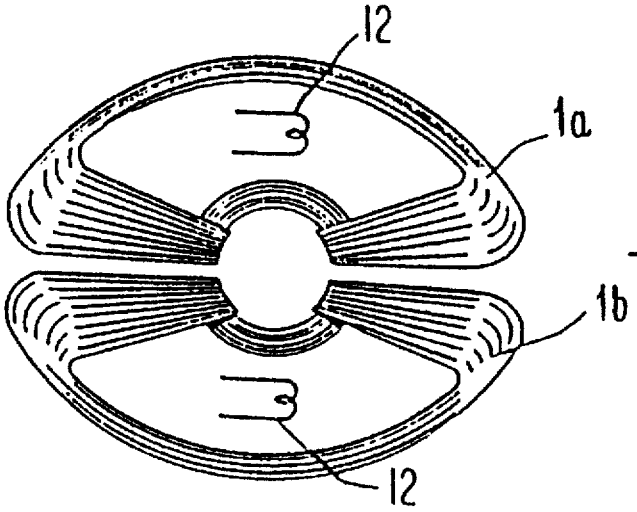
FIGS. 8 to 10 are diagrammatic views showing the relationship between the pick-up coil and the horizontal deflection coil in each embodiment.
Figure 9:
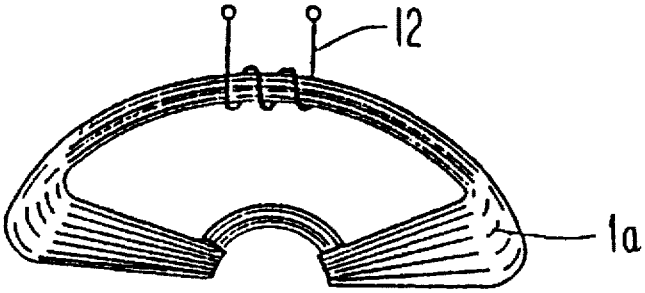
Figure 10:
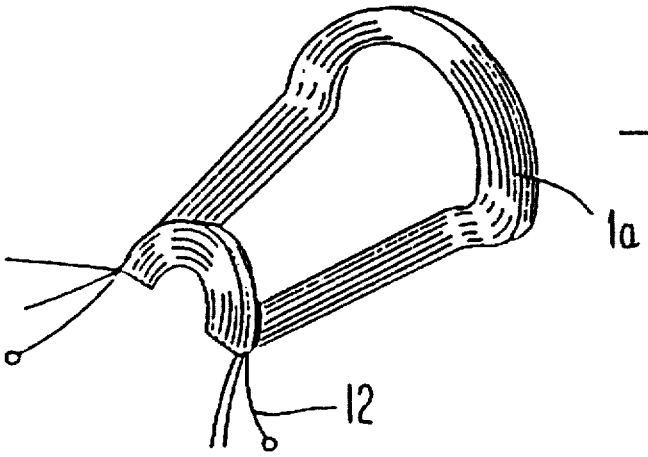

Referring to FIGS. 7 to 10, various examples of the current waveform shaping circuit 8 will be described:

Generally, the circuit 8 is constructed as shown in FIG. 7. In the above-mentioned embodiment the pick-up coils 12 are wound around the bobbin 11 for use in the differential coil 7a and 7b. Alternatively, as shown in FIG. 8, the pick-up coils 12 can be provided near the windows of the horizontal deflection coils 1a and 1b, thereby securing the electromagnetic coupling therebetween. FIG. 9 shows another modification in which the pick-up coils 12 are respectively wound around a forward arched portion and a backward arched portion of the horizontal deflection coil, thereby securing the electromagnetic connection therebetween. FIG. 10 shows a further modification in which a plurality of conductors are wound into horizontal deflection coils, one of which is used as a pick-up coil.

Figure 11:
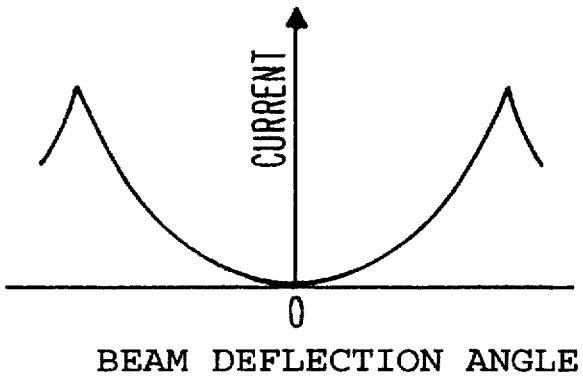
FIG. 11 is a diagrammatic view showing a parabolic waveform of a current.
Figure 12:
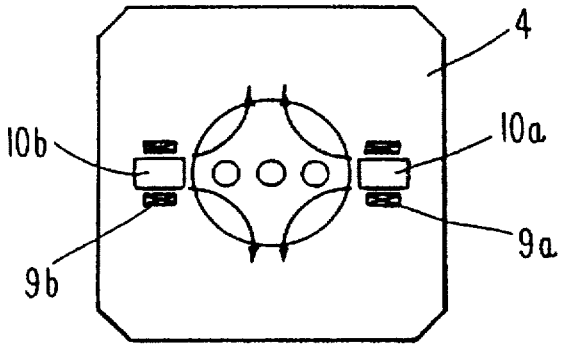
FIGS. 12 and 13 are diagrammatic rear views showing a positional relationship between a coil for generating a quadripolar magnetic field and a core of the coil in a preferred embodiment.
Figure 13:
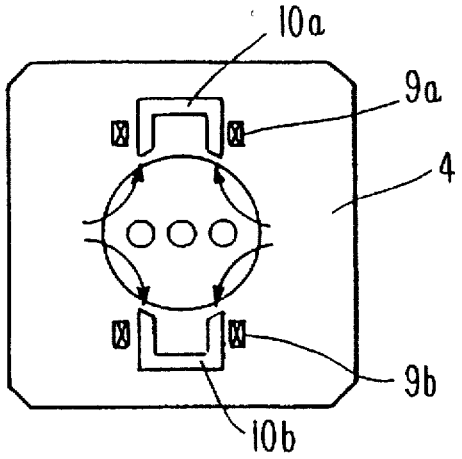

In the foregoing description the quadripolar magnetic field is generated in the left-hand half portion of the screen, but it is possible to generate it in the right-hand half portion thereof. Instead of the saw-tooth waveform, a parabolic current as shown in FIG. 11 can be generated in an integration circuit so that the left-hand and right-hand portions of the screen are simultaneously corrected. The pair of cores with coils can be provided in horizontally opposite positions as shown in FIG. 12. A generally U-shaped cores as shown in FIG. 13 can be used.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A deflection yoke for use in color cathode ray tubes, the deflection yoke comprising a larger rim portion and a smaller rim portion, a vertical deflection coil for generating a vertical deflecting magnetic field having a barrel-shaped distortion, and a horizontal deflection coil for generating a horizontal deflection magnetic field having a pin-cushion shaped distortion, a differential coil connected to the horizontal deflection coil, a pair of cores located in opposite positions in relation to the smaller rim portion, the cores being provided with coils for generating a quadripolar magnetic field, a pickup coil magnetically coupled to one of the differential coil and the horizontal deflection coil, and a current waveform shaping circuit for supplying a current to the quadripolar magnetic field generating coils.

2. A deflection yoke according to claim 1, wherein the differential coil is wound around the same bobbin as that for use in the pick-up coil.

3. A deflection yoke according to claim 1, wherein the [differential] *pick-up* coil is located near [windows] *a window* of the horizontal deflection coil.

4. A deflection yoke according to claim 1, wherein the [differential] *pick-up* coil is coupled to [the respective ends] *an arched portion* of the horizontal deflection coil.

5. A deflection yoke according to claim 1, wherein the [differential] *pick-up* coil is provided by part of the horizontal deflection coil.

6. A deflection yoke according to claim 1, wherein each of the pair of cores comprises a ferrite bar shaped like the letter I.

7. A deflection yoke according to claim 1, wherein the each of the pair of cores comprises a ferrite bar shaped like the letter U.

8. A deflection yoke according to claim 1, wherein the correction current comprises a half-cycle of the saw-tooth current.

9. A deflection yoke according to claim 1, wherein the correction current is a parabolic waveform current.

* * * * *